Nov. 16, 1954  J. B. PETTY  2,694,434
TRACTOR-BORNE PIPE BENDING MACHINE
Filed March 10, 1952  3 Sheets-Sheet 1

John B. Petty
INVENTOR.
BY Cecil L. Wood
ATTORNEY

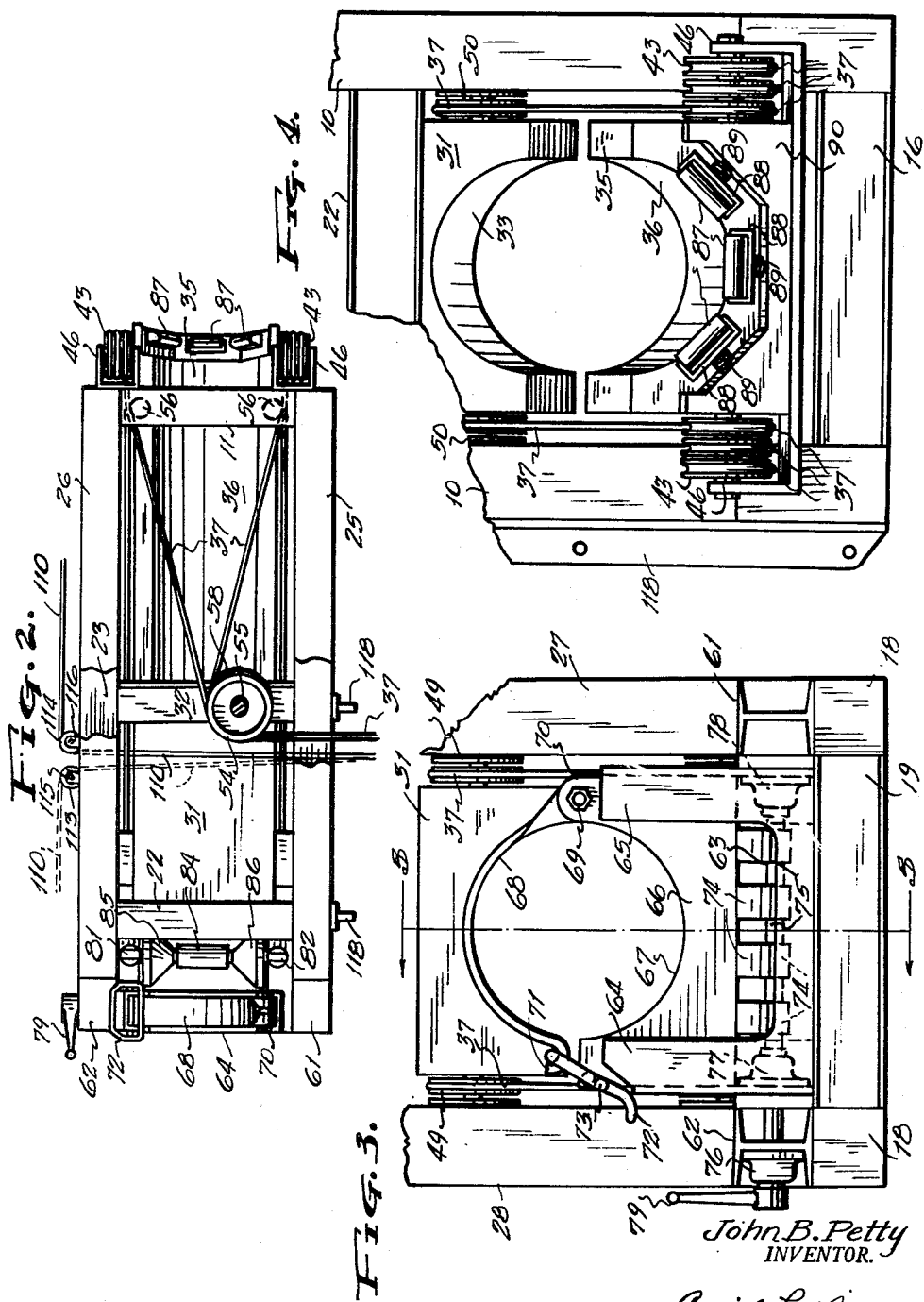

Nov. 16, 1954 J. B. PETTY 2,694,434
TRACTOR-BORNE PIPE BENDING MACHINE
Filed March 10, 1952 3 Sheets-Sheet 3
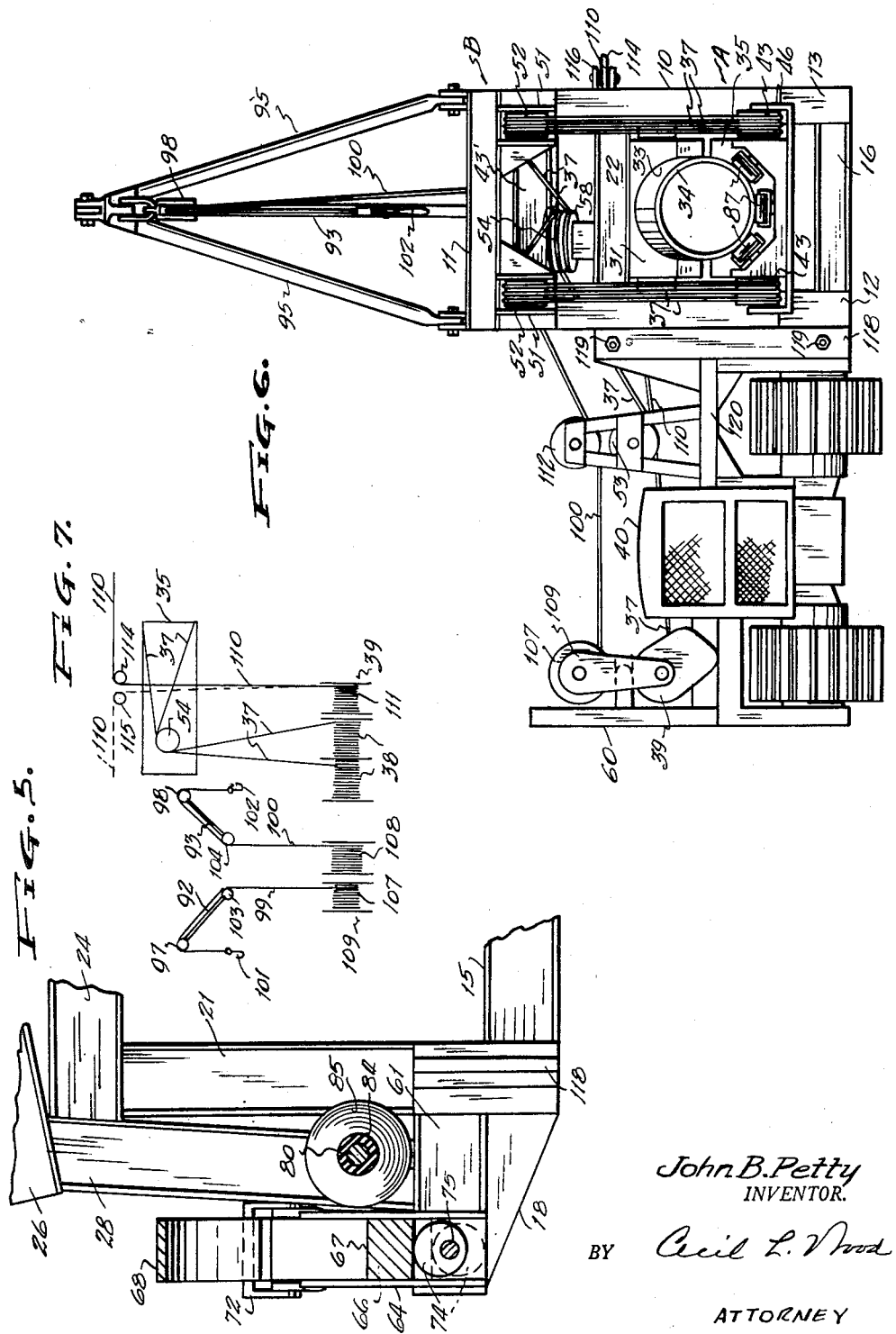
John B. Petty
INVENTOR.
BY
ATTORNEY

United States Patent Office 2,694,434
Patented Nov. 16, 1954

2,694,434

TRACTOR-BORNE PIPE BENDING MACHINE

John Bennett Petty, Broken Bow, Okla.

Application March 10, 1952, Serial No. 275,800

2 Claims. (Cl. 153—32)

This invention relates to heavy equipment for handling large diameter steel pipe for pipe lines and it has particular reference to portable bending machines by which large diameter pipe sections can be bent where necessary to conform the same to irregular terrain when laid in a pipe line, and the principal object of the invention resides in the provision of a machine of the character described which can be mounted on a conventional heavy duty tractor by which it can be readily transported and operated thus affording a mechanism which can be moved along the pipe line right-of-way as the work progresses and made available for bending operations on the site with a minimum of delay.

Another object of the invention resides in the provision of a portable pipe bending machine which can be economically constructed and operated, resulting in substitantial savings in time, manpower and equipment requirements in the operations usually attendant upon installing or laying a pipe line where welded steel pipe is used, as in oil or gasoline conduits of considerable length, enabling such projects to be completed in minimum periods of time and at lesser costs.

A still further object of the invention is that of providing a mechanism whereby relatively large diameter steel pipe sections can be bent to greater radii than is possible through the use of presently available equipment for like purpose, and to provide a machine which can be operated with fewer personnel since, by providing a tractor-carrier therefor, the transportation problem is of minor consideration and the tractor-powered mechanism for handling the pipe sections will minimize the time and effort necessary to place the pipe sections in the machine and remove them after the bending operations are completed.

It is an object of the invention to provide a pipe bending machine which is constructed so that pipe sections of different diameters can be bent to the proper radii quickly and efficiently without diametrical distortion, and this is accomplished by providing changeable bending dies and pipe supporting cradles which have transversely concave faces accurately conformable to the cylindrical contour of the pipe upon which bending operations are performed.

An important object of the invention is manifest in the provision of a novel means for holding the pipe sections at one end while applying the bending stresses to the opposite end against the arcuate-faced die to accomplish a series of short bends along the length of the pipe section which cumulatively result in the desired arc or radius required for the particular section, the said holding means being designed to be raised slightly after each bending operation to compensate for the gradual curvature of the section as the bending operations progress.

Broadly, the invention contemplates the provision of a pipe bending machine for welded steel pipe sections of the large diameter type, ranging from sixteen to thirty-six inches, and more, in diameter commonly used in carrier pipe-lines for oil, and other similar commodities, and affording an economical and rapid means for handling the pipe as the laying operations progress, thus avoiding much of the inconvenience and burdensome delay and expense generally occasioned by the use of conventional equipment designed for like purposes, and which ordinarily must be transported on dollies, or towed behind heavy tractors, from one location to another along the right-of-way.

While the foregoing objects are paramount, other and lesser objects will become manifest as the description proceeds, taken in connection with the appended drawings wherein:

Figure 1 is a side elevational view of the invention showing the bending die in the upper portion of the forward end of the frame, the cable operated cradle, and pipe handling booms.

Figure 2 is a plan view of the invention illustrating the top of the bending die and the operative surface of the cradle, and showing pipe clamp and rollers.

Figure 3 is a front elevational view of the pipe clamp and elevating cams, the upper portion of the frame being cut away.

Figure 4 illustrates the rear end of the machine showing, in elevation, the bending die, the cradle, the rear cable sheaves, and the pipe rollers.

Figure 5 is a fragmentary vertical sectional view, on lines 5—5 of Figure 3, showing the pipe clamp, elevating cams, and the yieldable pipe roller in the front end of the frame.

Figure 6 illustrates the invention, in rear elevation, attached to a tractor, the front of which is shown, and illustrating the arrangement of winches for the operating and boom cables, and Figure 7 diagrammatically illustrates the winch and cable arrangement for operating the cradle and booms.

In standard pipe line construction, it is generally required that the pipe must be buried a definitely prescribed depth, with only minimum tolerances allowed, and in relatively rough or irregular terrain, where hills and recessions are encountered, it is necessary to bend certain of the pipe sections to cause the line to conform to the earth's surface at a uniform depth thereneath.

Accordingly, the invention primarily comprises a frame structure A which is substantially rectangular in transverse section, as apparent in Figures 3, 4 and 6, and has a pair of H-beam columns 10 vertically arranged at the rear end which are connected by a horizontal header 11 at their upper ends. The columns 10 have angularly disposed portions 12 and 13 which connect the columns 10 with longitudinal bottom rails 14 and 15, also H-beams, and these are connected across the rear of the frame by a sill 16. A cross member 17 is arranged across the bottom rails 14 and 15 forwardly of the frame, as shown in Figure 1, whose function will presently become manifest. The rails 14 and 15 have upwardly inclined under surfaces 18 at their forward ends which are connected by a transverse sill 19 which is spaced rearwardly from the forward ends of the rails 14 and 15.

The uprights or columns 20 and 21, at the forward end of the frame, are shorter than the rear columns 10 and are located at each end of the front sill 19. The upper ends of the front columns are connected by a header 22. The upper longitudinal rails 23 and 24 extend from the columns 10 forwardly to the tops of the front columns 20 and 21.

A super-frame structure 13 is supported upon the frame A and comprises a pair of parallel H-beams 25 and 26 which incline downwardly and forwardly from the header 11 to the front of the frame A and are connected to the tops of supports 27 and 28 whose lowermost ends are secured to the forward ends of the bottom rails 14 and 15 and incline rearwardly at their upper ends, as shown in Figures 1 and 5. The super-frame B is suitably braced by short vertical members 29 and 30 on each side thereof and supported on the members 23 and 24, as shown in Figure 1.

A cast bending die 31 is supported in the top of the frame A toward the forward end thereof beneath the forward header 22, at its front end, and a cross-member 32 intermediate the ends of the members 23 and 24, as shown in Figures 2, 4 and 6, and while flat on its upper surface, the operative face 33 of the die 31 is semi-cylindrical or concave in transverse section, as apparent in Figures 4 and 6, to conform to a pipe section 34, shown in Figure 6, and is curved upwardly and rearwardly in the manner illustrated in Figure 1.

Operatively suspended in the frame A below the die 31 is a pipe cradle 35 which extends beyond the rear end of the frame A, as shown in Figures 1 and 2, and is adapted to cooperate with the die 31. The operative face 36 of the cradle 35 is semi-cylindrical, or concave in transverse section, as shown in Figures 2 and 4, similarly to the face 33 of the die 31, and complements this member in embracing the pipe section 34 in the bending operation which will presently be described.

The cradle 35 is fabricated from relatively heavy plate and properly reenforced internally and transversely of the face 36, and is operatively suspended by a cable 37 which is reeled on the spool 38 of a winch 39 on the tractor 40, shown in Figure 6.

A system of sheaves is arranged on the frame A, and in the super-frame B, over which the cable 37 is passed to operate the cradle 35 on which a plurality of sheaves is also arranged, as shown in Figure 1. The cradle 35 has a plurality of pairs of grouped sheaves 41, 42 and 43 spaced therealong, the sheaves 41 are supported in brackets 44 on each side of the front end of the cradle 35, the sheaves 42 are arranged in brackets 45 on each side of the cradle 35 and spaced rearwardly from the sheaves 41, and the sheaves 43 are pivoted in brackets 46 on each side of the cradle 35 near the rear extended end thereof.

Suspended from the beams 23 and 24, on each side of the die 31, are spaced brackets 47 and 48, the former having grouped sheaves 49 pivoted therein while the latter brackets 48 have grouped sheaves 50 therein. The sheaves 50 are directly above the sheaves 42 on each side of the cradle 35 while the sheaves 49 are slightly out of vertical alignment with the forward sheaves 41 on the cradle 35. Brackets 51 are secured to the rear faces of the columns 10 and at the upper ends thereof so that the grouped sheaves 52 in each bracket are in alignment with the sheaves 43 on the rear end of the cradle 35.

Thus, the cable 37 which supports the cradle 35, and by which it is operated, extends from the spool 38 of the winch 39 about an idler sheave 53 and upwardly about the lowermost sheave 54, which is pivoted in an angular plane on a shaft 55 journalled in the cross-members 32 and 43' in the super-frame B intermediate the ends thereof, as shown in Figures 1 and 2.

The cable 37, after being passed about the sheave 54 is aligned with one of the sheaves of the group 52, by an idler pulley 56 beneath the header 11, and is extended downwardly over the corresponding sheave of the group 43 on the rear end of the cradle 35, thence back upwardly over a second sheave of the group 52 and again downwardly about the second sheave of the group 43, thence forwardly along one side of the cradle 35 and about one of the sheaves 42 and upwardly over one of the sheaves 50 and downwardly and about another of the sheaves 42, and forwardly along the side of the cradle 35 and about one of the sheaves 41, thence upwardly over one of the sheaves 49, and downwardly over a second sheave of the group 41, and upwardly again over a second sheave 49 and downwardly and beneath the cradle 35 and upwardly over the sheaves 49 on the opposite side of the frame A, and through the same course about the idler pulley 57, opposite the pulley 56 and around the sheave 58 on the shaft 55 and then back to the spool 38 of the winch 39 on the tractor 40.

By this arrangement of the cable 37 the force exerted thereon by the tractor-powered winch 39 is compounded, and obviously a more even tension can be applied to the cradle 35.

At the front of the frame A, and on each of the extended portions of the beams 14, are short sections of H-beams 61 and 62, and between these members and on the cross-member 19 is supported a receptacle 63 formed with opposingly formed vertical legs 64 and 65 which provide guides for the vertical sides of a heavy pipe rest 66 whose upper surface 67 is semi-circular, as apparent in Figure 3, to conform to the cylindrical contour of the pipe section 34. For different diameter pipe sections it is desirable that the pipe rest 66 be changeable.

The member 66 has a clamp 68 which comprises a wide metal band hinged on a pin 69 arranged through a pair of ears 70 integral with one side of the pipe rest 66. The opposite end 71 of the clamp 68 is turned outwardly and upwardly to provide means for securing the clamp 68 upon a pipe section by a latch 72 which is pivoted at 73 to the opposite side of the pipe rest 66 from the hinge pin 69.

The pipe rest 66, being slidably disposed in the receptacle 63, is capable of vertical adjustment in the guides 64 and 65 by a plurality of eccentric cams 74 on a shaft 75 journalled in bearings 76, 77 and 78 within the guide members 64 and 65, as shown in Figure 3, and the shaft 75 has a lever 79 on one end by which it can be rotated as required to raise and lower the pipe rest 66.

Behind the pipe rest 66 is a roller assembly mounted on a shaft 80 which is supported at each end in bearings 81 and 82 which are cushioned by coil springs 83, as shown in Figures 1, 2 and 5. The roller assembly comprises a cylindrical member 84, intermediate the ends of the shaft 80, having opposingly arranged conical rollers 85 and 86 at the ends of the member 84. The rollers 85 and 86 and the member 84 are preferably of a yieldable composition, such as rubber or neoprene, and functions to support the pipe sections as these are moved toward the front of the machine across the pipe rest 66.

Arranged about the concave surface 36 of the cradle 35 are a plurality of rollers 87, each pivoted in a bracket 88 supported by a spring 89 on a supporting block 90 so that the operative surfaces of the rollers 85 and 86 project above the curved surface 36 of the cradle 35 only slightly to expedite the movement of a pipe section therealong. The springs 89 will yield when pressure is applied to the pipe section in bending operations.

Attached to the top of the super-frame B, and intermediate its ends, is a base assembly 91 for a pair of shear poles 92 and 93 which extend forwardly and rearwardly of the machine. The poles 92 and 93 are operatively supported by A-frames 94 and 95 whose legs are hinged to brackets 96 at each corner of the super-frame B, as apparent in Figures 1 and 6. Pulley blocks 97 and 98 are suspended from the outer ends of the poles 92 and 93 and cables 99 and 100, having hooks 101 and 102 on their free ends, are arranged about pulleys 103 and 104 in brackets 105 and 106 attached to the base assembly 91, and wind upon the spools 107 and 108 of the winch 109 on the tractor 40, as exemplified in Figure 7.

To expedite handling the pipe sections inserted into the machine a cable 110, on a spool 111 of the winch 39, is extended under one of the idler pulleys 112 and through the frame A to the opposite side thereof to be operated over either one of two pulleys 113 and 114 pivoted in brackets 115 and 116 on the side of the frame B, shown in Figures 2 and 6, and a hook 117 is provided on the free end of the cable 110 which can be attached to the end of a pipe section to enable the latter to be pulled into or out of the machine from either direction.

The frame A is attached to the tractor 40 by brackets 118 through which bolts 119 are fixed, as shown in Figure 6, and a mounting frame 120, and it is desirable to mount the invention on the left side of the tractor 40. However, the "front" of the invention, as the term is here used, is at the rear of the tractor, the reason being that pipe sections are processed in that order, to be removed from the machine at the rear of the tractor.

In operation, a pipe section 34 is picked up at one end by the cable 100 and the cable 110 is employed to draw the pipe into the machine to rest in the cradle 35 and be secured in the pipe rest 66 by the clamp 68 thereon. The distance the pipe extends from the forward end of the machine depends upon the point at which the bend is to be made, or where it is determined that the radius of curvature of the pipe should occur.

Large diameter pipe is relatively difficult to bend and care should be exercised to properly calculate the degree of radius desired and the length of such radius before starting to bend the pipe. After the pipe section is properly placed in the cradle 35 the winch 39 is started to raise the same which, when the pipe is engaged with the die 31, will begin rising at the rear of the machine so that, as greater pressure is applied to the pipe through the cable 37, and since the forward end of the pipe cannot yield, the pipe will conform to the radius of the die 31.

The amount of pressure required for bending pipe of large diameter depends upon the size of the pipe and the degree of curvature required. It is necessary, therefore, to move the pipe through the machine only a few inches for each bending operation. The movement of the pipe is accomplished by use of the cable 110 which can be operated from either end of the machine. As the pipe is moved forwardly after each bending operation it is necessary to raise the pipe rest 66 by the cams 74, which are operated by the lever 79, to insure a firm seat for the pipe which, after a number of bends are performed thereon, projects from the front end of the machine. Both the die 31 and the cradle 35 are changeable to provide for bending different diameter pipe.

It is contemplated that certain changes and modifications in the structural design and the arrangement of parts may be resorted to by persons skilled in the art, without departing from the spirit and intent of the invention or the scope of the appended claims.

What is claimed is:

1. In a bending machine for large diameter pipe, the combination of a tractor having a frame supported on one side thereof and capable of receiving a pipe section longitudinally therethrough, a cradle in said frame conformably supporting a pipe section therein, a cable supporting said cradle and operated from said tractor to raise said cradle, a bending die in the said frame above and forwardly of said cradle and in cooperative relationship therewith to conformably engage a pipe section on said cradle as the latter is operated by said cable, means for moving pipe sections into and from said frame comprising a pair of upwardly extending supports rigidly mounted on said frame and arranged to extend forwardly and rearwardly therefrom, a pulley on each support, and a cable for attachment to the work extending over each pulley, and vertically adjustable means forwardly of said cradle in said frame for securing a pipe section while said cradle is operated toward said die.

2. In a bending machine for large diameter pipe, the combination of a tractor having a frame attached to one side thereof, a cradle operatively supported in said frame and longitudinally thereof, the upper surface of said cradle being formed semi-circular in transverse section to receive and support a pipe section, a cable supporting said cradle and operated by said tractor, a bending die in the upper portion of said frame having its under surface complementing the upper surface of said cradle and engageable with a pipe section thereon, the said under surface of said die being arched rearwardly and upwardly, means for moving pipe sections into and from said frame comprising an upwardly extending support rigidly mounted on each end of said frame, a pulley on each support, and a cable for attachment to the work extending over each pulley, and vertically adjustable means forwardly of said frame for securing the forward end of a pipe section while said cradle is operated toward said die.

References Cited in the file of this patent

UNITED STATES PATENTS

| Number | Name | Date |
|---|---|---|
| 183,190 | McWilliams | Oct. 10, 1876 |
| 533,965 | Richard | Feb. 12, 1895 |
| 1,136,252 | Meir | Apr. 20, 1915 |
| 2,589,651 | Ballard | Mar. 18, 1950 |